United States Patent [19]
Crandell et al.

[11] Patent Number: 5,579,717
[45] Date of Patent: Dec. 3, 1996

[54] METHOD OF GRINDING THIN-FILM MAGNETIC HEADS USING OPTICAL GRINDING MARKERS

[75] Inventors: Douglas W. Crandell, Morgan Hill; Edward H. P. Lee, San Jose; David J. Seagle, Morgan Hill, all of Calif.

[73] Assignee: International Business Machines Corporation, Armonk, N.Y.

[21] Appl. No.: 324,424

[22] Filed: Oct. 13, 1994

[51] Int. Cl.⁶ .................................................. G01D 21/00
[52] U.S. Cl. ................................................................. 116/208
[58] Field of Search .......................... 116/208; 29/603.01, 29/603.02, 603.03, 603.04

[56] References Cited

U.S. PATENT DOCUMENTS

| | | | |
|---|---|---|---|
| 3,414,272 | 12/1968 | Rogers, Jr. | 116/208 |
| 3,842,792 | 10/1974 | Souther | 116/208 |
| 3,969,749 | 7/1976 | Bean | 357/49 |
| 4,511,942 | 4/1985 | Valstyn | 360/126 |
| 4,648,212 | 3/1987 | Dawson et al. | 51/165 |
| 4,841,625 | 6/1989 | Valstyn | 29/603.1 |
| 5,056,353 | 10/1991 | Matono | 73/7 |
| 5,305,559 | 4/1994 | Ogawa | 29/603.01 |
| 5,331,495 | 7/1994 | Yoshida et al. | 360/126 |

*Primary Examiner*—Thomas B. Will
*Assistant Examiner*—Willie Morris Worth
*Attorney, Agent, or Firm*—Paik Saber

[57] ABSTRACT

According to the present grinding method, a plurality of optical markers are formed by photolithography such that the markers are embedded in a chiplet having a magnetic head. Markers are preferably in the shape of a bar having predetermined height, width and length and are spaced from each other by a predetermined distance where one end of the bars are sequentially offset from each other by a predetermined amount. During coarse grinding of the magnetic head as the magnetic head surface material is ground away, the end-face of the bars, one at a time, become visible. The closer the grinding surface approaches the desired inductive throat or MR element height, more end-faces become visible. Coarse grinding continues until a predetermined number of end-faces become visible at which point the grinding process is terminated and the magnetic head is ready for the final lapping process.

28 Claims, 9 Drawing Sheets

METHOD OF GRINDING THIN-FILM MAGNETIC HEADS USING OPTICAL GRINDING MARKERS

BACKGROUND OF THE INVENTION

1. Field of the Invention

The present invention relates generally to a method of grinding (lapping) a chiplet for forming a magnetic head(s) and the construction of thin-film magnetic heads. More particularly, this invention relates to: (a) a grinding (lapping) method where optical grinding markers are utilized for easy and accurate determination of the amount of working performed grinding a specified portion of a magnetic head to form the air bearing surface of the head; (b) thin film magnetic heads bearing such optical markers; and (c) a process for producing magnetic heads having such optical markers.

2. Description of the Background Information

In data processing systems, magnetic recording has been employed for storing large amounts of data on magnetic recording disks and magnetic tapes. In the case of the magnetic recording disks, data is read from and written onto the tracks by positioning magnetic transducers, commonly referred to as magnetic heads, adjacent to the tracks. In recent years, the requirement for higher data density on the magnetic recording medium has imposed a requirement to store more data on ever narrowing tracks. In order to read from and write onto such narrow tracks, a new type of head known as a thin-film magnetic head has been utilized where the magnetic head elements are formed from thin films of magnetic materials. These heads, which generally comprise a conductive core and are formed in layers on a substrate with an insulating layer interposed between adjacent conducting layers, are fabricated by thin film fabrication techniques such as vacuum evaporation, sputtering and photolithography. Thin film magnetic heads have the advantage that they can be made much smaller than conventional bulk-type material heads. Such thin film heads may also comprise magneto-resistive (MR) elements for reading data from tracks that are very narrow.

Since thin-film magnetic heads are much smaller than the bulk-type magnetic heads in the depth of the magnetic gap, in order to achieve maximum efficiency, that is, to achieve maximum amount of electrical signals from a given magnetic head element, the element must have a pole tip height dimension, commonly referred to as throat height for thin-film inductive heads, or element height in the case of a magneto-resistive read element, which must be maintained within a predetermined tolerance. A method of producing a required throat/element height for magnetic elements includes a coarse or fast grind step followed by a lapping or fine grind step.

U.S. Pat. No. 5,305,559, issued on Apr. 26, 1994, proposes a magnetic head structure, seen in FIG. 8 of this application, where a pair of first and second markers 32, 34 are formed by photolithography in the magnetic core. Each marker has two edges which are spaced from each other in a direction of width of the magnetic gap and further the two edges are located on the same side as viewed in the gap width direction. Markers 32a and 32b are formed in a V-shape and markers 34a and 34b are formed using two right-angle isosceles triangles.

In this method, grinding can only be monitored by measuring the first distance between the two edges of each marker which is exposed on the working surface under grinding, so as to determine a required residual depth of the grinding which is to be further effected to establish a nominal depth dimension of the magnetic gap. However, substantial time had to be taken using optical equipment with high precision in order to precisely measure the distance between the two edges of each marker which is exposed to the working surface under grinding.

U.S. Pat. No. 5,056,353, issued on Oct. 15, 1991, proposes a thin film magnetic head structure, as seen in FIG. 9 of this application, having a working amount detecting markers 6 formed by two thin films superposed in layers on the upper surface of a substrate in the form of a polygon. The contours of the respective thin film layers intersect each other at a point located at a specified position where working is to be completed. In this structure, the presence or absence of overlapping between the two marker layers appearing on the ground surface provides a rough visual indicator as to how far the workpiece has been lapped. Also, once the point of intersection appears on the ground surface, it indicates completion of grinding.

However, this structure requires two marker layers where the first marker layer is formed on the upper surface of the lower magnetic core and the second marker layer is formed over the first marker layer with an insulating layer interposed therebetween. Furthermore, while the working piece is being lapped, and while an operator is observing the configuration of the end face of the detecting markers, as they appear on the lapping surface, there is no indication as to how far the lapping process is from reaching the intersection point. Only by measuring the width of at least one marker layer having the side inclined with respect to the direction of progress of lapping, the amount of gap depth remaining to be lapped can be calculated.

Therefore, an invention is needed that provides accurate and easily available information in regard to how far the thin film head has been lapped or how much lapping remains to be performed using a low power microscope (20 to 100× magnification) without a need for making dimensional measurement(s) or the use of precision optical equipment such as a high power microscope.

SUMMARY OF THE INVENTION

It is therefore an object of the present invention to provide a method of grinding (lapping) magnetic heads using at least one optical marker formed on the chiplet for accurate and easy determination of whether the grinding target has been met.

It is another object of the present invention to provide an optical detecting marker for accurate and easy determination of whether the grinding target has been reached.

The foregoing objects are achieved by the invention disclosed herein. Briefly stated, given a chiplet having a ground surface and where the chiplet is a unit cell on a head wafer, the present invention provides an optical marker on such chiplet for determining the amount of work remained to be performed grinding a specified portion of a magnetic head to form the air bearing surface (ABS) of the head. The ABS of the head is adjacent to magnetic recording media. In one embodiment, the optical marker comprises a block having a lapping surface and plurality of bars and gaps interleaved therein. The bars are spaced apart from each other. Each gap is bounded by an end-wall where the surface of the end-walls are sequentially offset from each other by a predetermined amount. Furthermore, the lapping surface of the block is adjacent to the chiplet ground surface.

In producing a magnetic head with this marker, the ABS portion of the magnetic head to be adjacent to the magnetic medium is formed by grinding the chiplet while periodically observing the configurations of the end-face of the solid bars appearing on the ground surface.

As the grinding proceeds, the block sequentially and at predetermined intervals breaks into several solid bars, each solid bar having an end-face. The number of end-faces appearing on the ground surface visually indicates how far the chiplet and therefore the magnetic head has been ground and how much longer the grinding operation must continue in order to reach the grinding target. Once a predetermined number of end-faces appear on the ground surface, it indicates that the magnetic head has been ground to the specified grinding target and therefore the grinding process is terminated.

In another alternative embodiment, the optical marker comprises a plurality of predetermined unequal sized bars having an end-face adjacent to the chiplet ground surface. The bars are horizontally spaced apart and one end of the bars are vertically offset from each other by a predetermined amount. Initially, all the end-faces are seen on the ground surface, but as grinding proceeds, the end-faces disappear sequentially, visually indicating the amount of grinding left to be performed in order to reach the grinding target. The disappearance of an end-face from the ground surface indicates that the bar associated with that end-face has been completely ground away. Once a predetermined number of end-faces disappear from the ground surface, it indicates that the magnetic head has been ground to the specified grinding target and consequently the grinding process is then terminated and the head is ready for the final lapping process.

In an alternative embodiment, the optical marker comprises a plurality of equal-sized bars having an end-face. The bars are horizontally spaced apart and vertically offset from each other by a predetermined amount. Initially, none of the end-faces can be seen on the ground surface, but as the grinding process proceeds, end-faces appear on the ground surface one at a time visually indicating how far the magnetic head has been ground. Once a predetermined number of end-faces appear on the ground surface, it indicates that the magnetic head has been ground to the desired grinding target and the grinding process is then terminated and the chiplet is ready for the final lapping process.

In an alternative embodiment, at least one optical marker of the type explained herein is placed at each opposite side of the optical head near the chiplet ground surface thus providing an accurate and easy means for measuring the degree of skew in the grinding process.

Since optical markers cannot be seen while grinding is taking place, the grinding process must be stopped periodically so visual inspection of the optical marker(s) can take place utilizing an optical microscope.

BRIEF DESCRIPTION OF THE DRAWINGS

For a fuller understanding of the nature and advantage of the present invention, as well as the preferred mode of use, reference should be made to the following detailed description read in conjunction with the accompanying drawings.

FIG. 3A' is an air bearing view of the marker of FIG. 3A;

FIG. 3B' is an air bearing view of the marker of FIG. 3B;

FIG. 3C' is an air bearing view of the marker of FIG. 3C;

BEST MODE FOR CARRYING OUT THE INVENTION

The following is the best presently contemplated mode for carrying out the invention. This description and the number of alternative embodiments shown are made for the purpose of illustrating the general principle of the present invention and is not meant to limit the inventive concept claimed herein.

Figure 1:
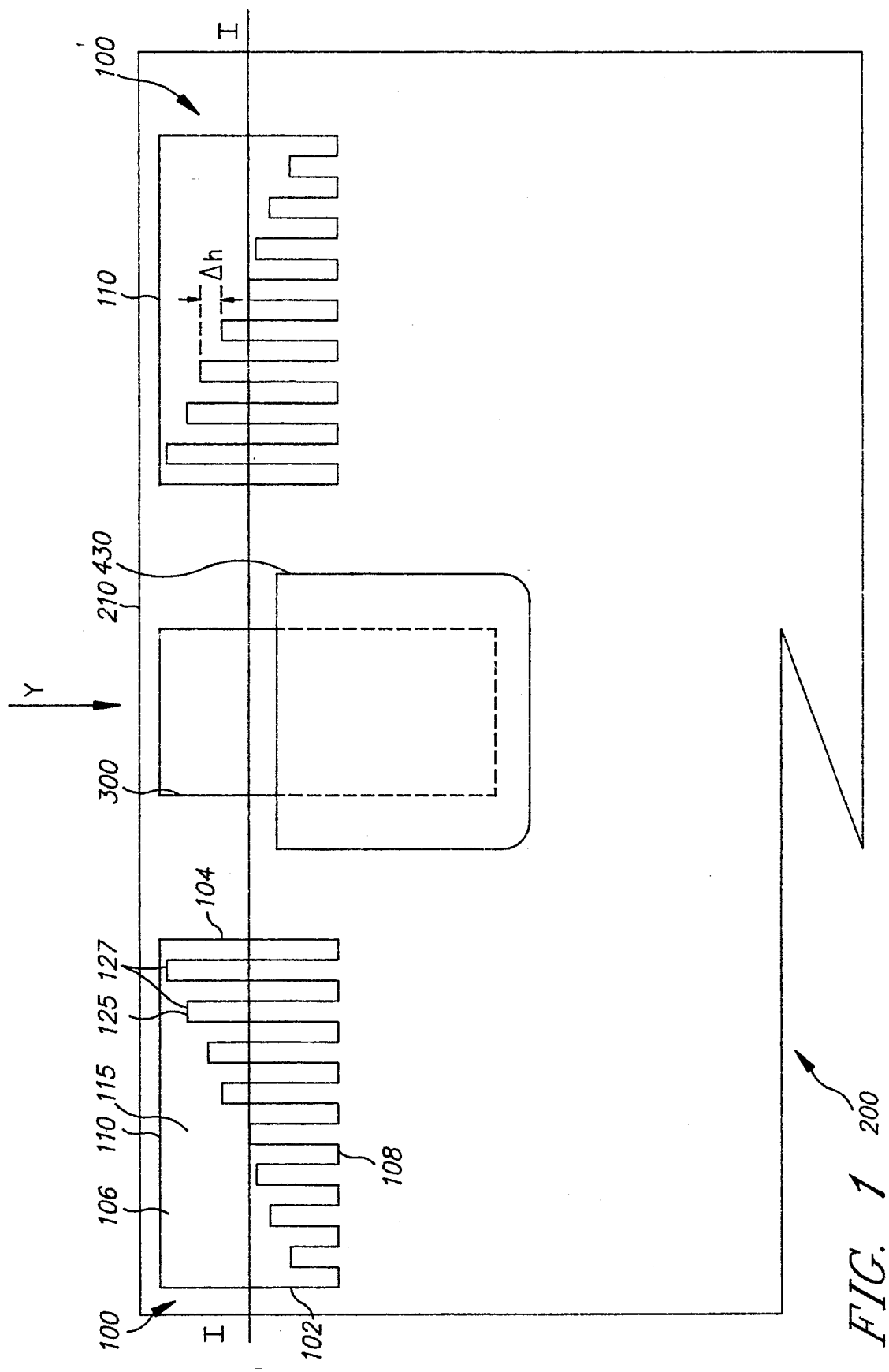
FIG. 1 is a wafer plane view of a chiplet showing the process step for forming the final magnetic layer and the preferred markers used according to the present invention, together with the magnetic head.

With reference now to FIG. 1, there is shown a wafer plane view of the process step for forming two optical markers 100 on the chiplet 200 according to the present invention, together with the magnetic head 300. The chiplet 200 which comprises the magnetic head 300 is a unit cell on a thin film magnetic head wafer (not shown). The chiplet 200 further has a ground surface 210. The optical marker 100 has first, second, third and fourth sides, 102, 104, 106 and 108, where side 106 comprises a lapping surface 110. The optical marker 100 is formed during the process step of forming the final magnetic layer 430 (FIG. 2) during the fabrication process of a thin film magnetic head 300 having an inductive write head and an magneto-resistive (MR) read head. The chiplet 200 which comprises the magnetic head 300 is lapped in the direction labelled Y toward the grinding target shown by line I—I.

The final magnetic layer 430 is formed in a step of a process for making thin film heads with inductive and MR heads as described below.

Figure 2:
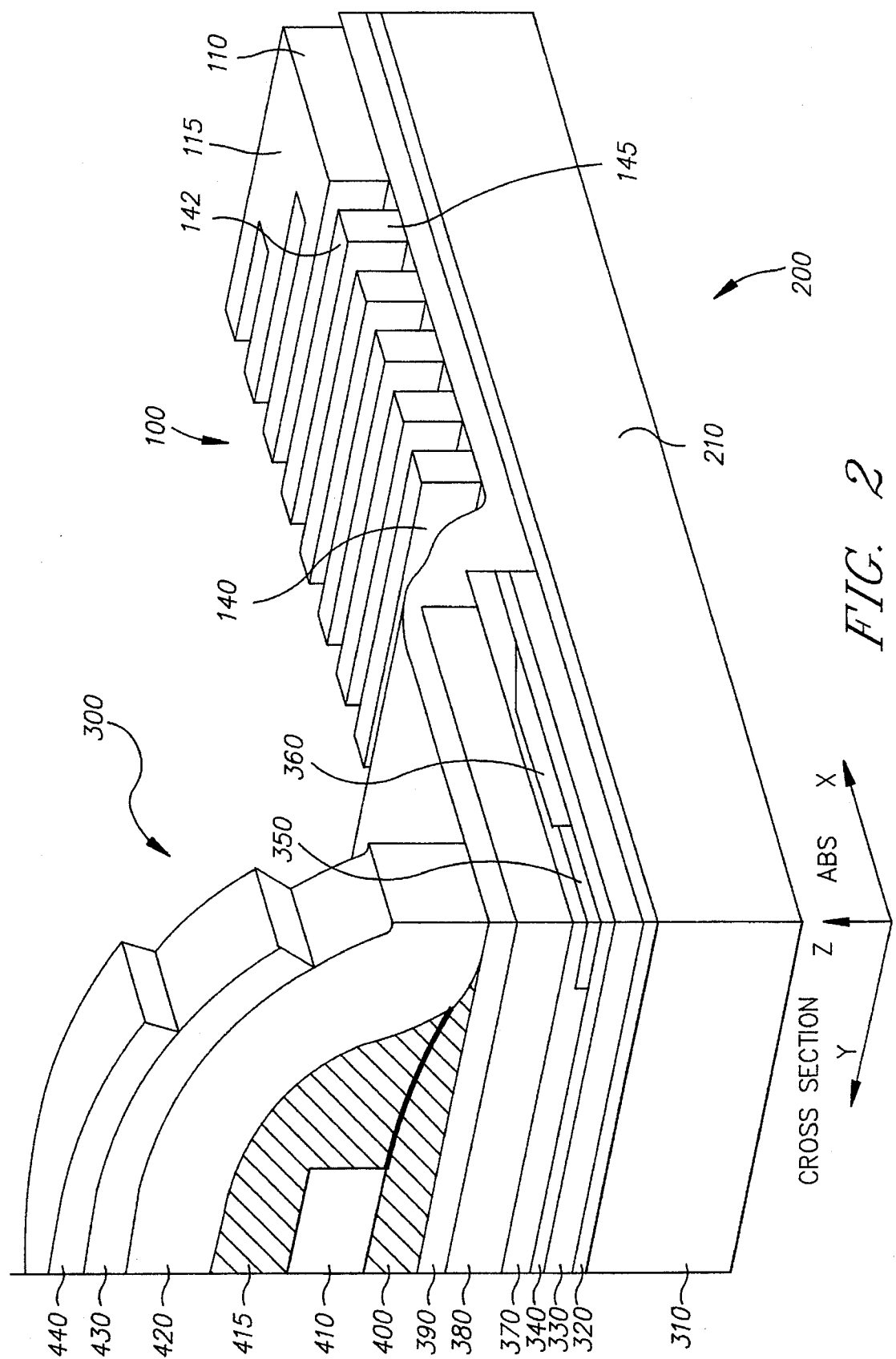
FIG. 2 is a perspective view of the cross sections of a chiplet comprising a magnetic head having a write inductive head and a read MR element, together with the preferred marker of the present invention.

With reference now to FIG. 2, there is shown a perspective view of a cross section of a chiplet 200 having a thin film magnetic head 300 together with the preferred optical marker 100 of the present invention.

A typical chiplet 200 having a thin film magnetic head 300 and the optical marker 100 of the present invention is fabricated during the fabrication of a thin film magnetic head wafer as follows: First, a magnetic material film 330 is formed by a known fabrication technique such as vacuum evaporation or sputtering on the insulator 320 which is formed on the substrate 310. The film 330 is then shaped into a predetermined configuration. The film 330 may be made of sendust (aluminum-silicon-iron alloy) or similar magnetic materials and the insulator 320 may be made of ceramic, silicon dioxide or similar materials. Next, a second insulating layer 340 is formed over the entire area of the upper surface of the film 330 followed by the formation of MR sensor 350 and MR sensor lead 360 over a portion of the upper surface of the second insulating layer 340. The MR sensor 350 may be made of permalloy (nickel-iron) or similar magnetic materials. Then a third insulating layer 370 is formed over the entire area of the upper surface of the MR element 350 and the MR sensor lead 360 followed by the formation of a magnetic material film 380 over a portion of the third insulating layer 370. Subsequently a fourth insulating layer 390 is formed over the entire upper surface of the film 380 followed by a fifth insulating layer 400 formed over partial upper surface of insulating layer 390. Next, a metal film 410 is formed over a portion of the insulating layer 400 followed by the formation of insulating layer 415 over metal film 410. Metal film 410 may be made of copper or similar conducting material. Then a magnetic material film 420 is formed over the insulating layer 415 followed by the formation of final magnetic material film 430 over the film 420. Film 430 may be made of magnetic materials such as permalloy.

During the process step of forming the film 430 at least one optical marker 100 is formed on each chiplet 200, using the same film 430. The optical marker(s) 100 is formed at predetermined coordinates on the chiplet 200 near the air bearing surface (ABS) of the head and is adjacent to the ground surface 210 of the chiplet 200.

In the final processing step, the protective insulator 440 (partially shown) is deposited over the entire film 430 which results in covering the entire upper surface 115 of the marker 100 on each chiplet, all the sides of the optical marker 100 on each chiplet, as well as filling the gaps 120 of every optical marker 100 with insulator 440. The thin film magnetic head wafer is then divided into many chiplets 200, each chiplet 200 having a thin-film magnetic head 300 and one or more optical markers 100.

The chiplet 200 containing the thin film head 300 is then individually and progressively ground while visually monitoring the number of end-faces 145 of the bars 140 appearing on the ground surface 210 next to each head 300. Once a predetermined number of end-faces 145 appear on the ground surface 210, the grinding operation is terminated and the head is available for final lapping. The end-faces 145 are visually detectable and distinguishable, using an optical microscope, from the surrounding insulator 440 because of the difference between the materials used to fabricate optical marker 100 and the surrounding insulating material 440.

Figure 3A:
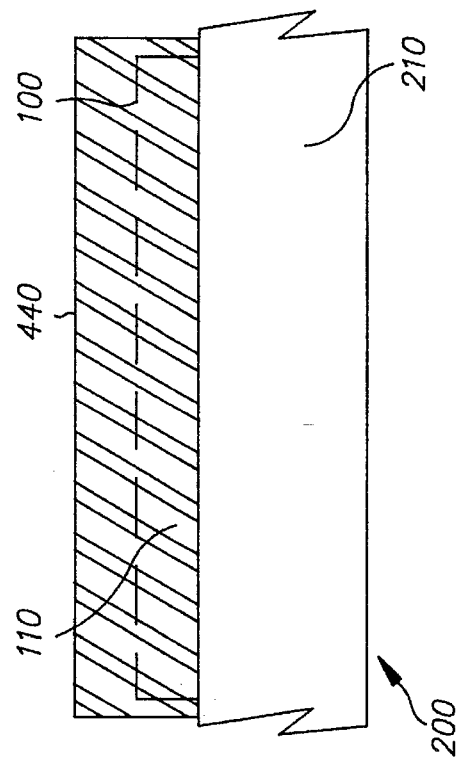
FIG. 3A is an enlarged wafer plane view showing the preferred optical marker of FIG. 1 prior to the beginning of the grinding process according to the present invention.
Figure 3B:
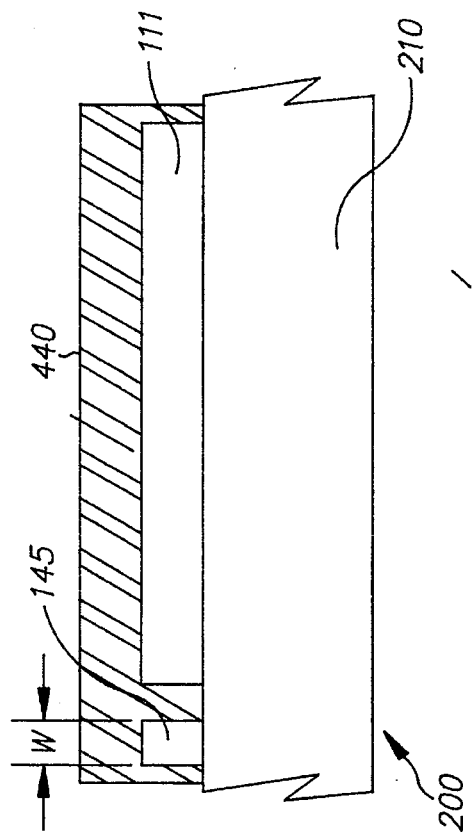
FIG. 3B shows the marker of FIG. 3A at a specific point during the grinding process.
Figure 3A:
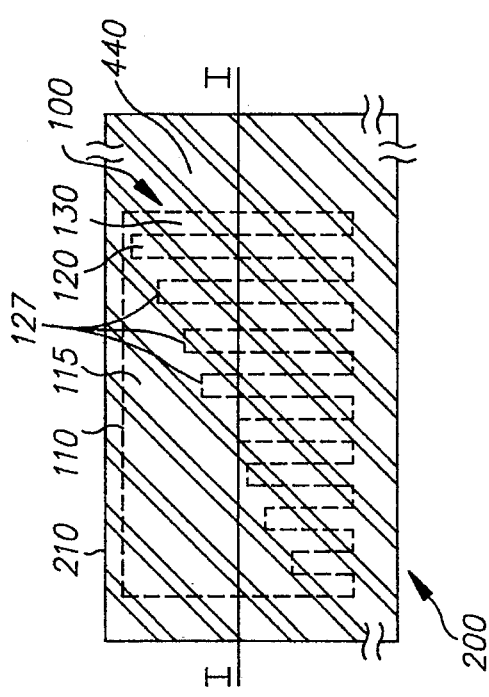
Figure 3B:
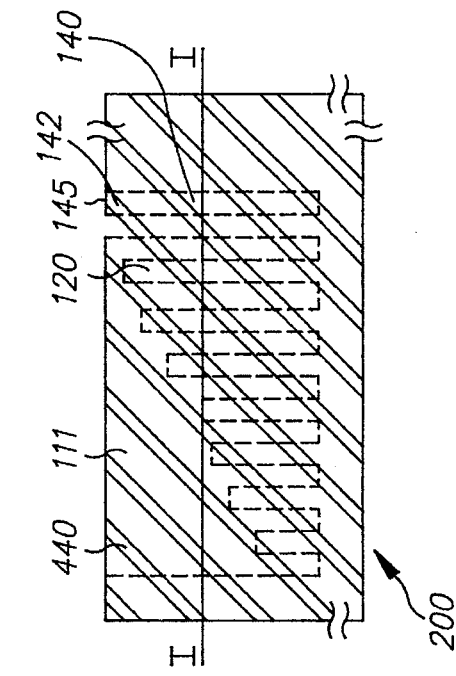
Figure 3C:
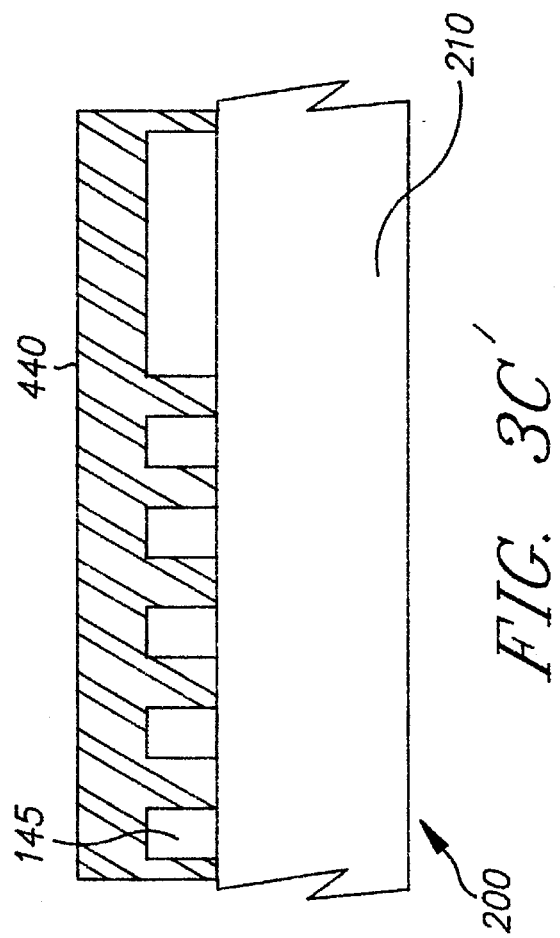
FIG. 3C shows the marker of FIG. 3A at the completion of grinding process.
Figure 3C:
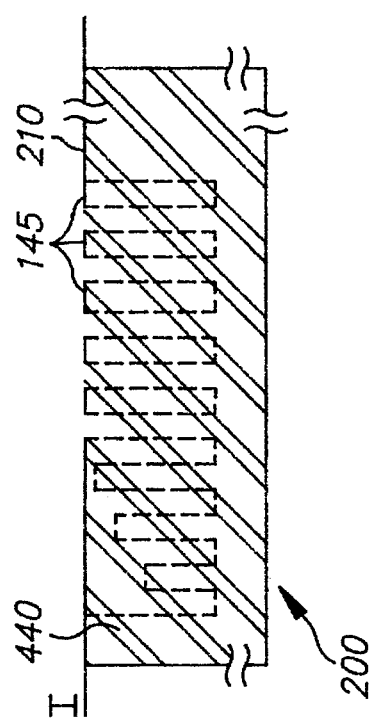

FIGS. 3A, 3B, and 3C are enlarged wafer plane views of the preferred optical marker 100 shown on a portion of the chiplet 200 covered by the insulating material 440 (shown by double diagonal lines) before, during, and at completion of the grinding process, respectively. The grinding target on FIGS. 3A, 3B, and 3C are shown by line I—I. FIGS. 3A', 3B', and 3C' are the ABS views of the markers 100 of FIGS. 3A, 3B, and 3C, respectively, together with a portion of the chiplet 200 and the insulator 440 (shown by double diagonal lines) covering the optical marker 100.

Now, with reference to FIGS. 1 and 3, the marker 100 is formed in a shape of a block having a predetermined height, width and length. The marker 100 further has a lapping surface 110 on side 106 of the marker 100 adjacent to the ground surface 210 of the chiplet 200. The optical marker 100 also has a plurality of gaps 120 and a plurality of bars 130 interleaved therein.

In the preferred embodiment, the bars 130 are parallel with each other, all have the same width W (in the range of about 5 to 15 microns), and all are substantially perpendicular to the lapping surface 110 of the marker 100. The gaps 120 all have the same width (in the range of about 5 to 15 microns), each gap 120 has a predetermined length in the range of about 5 to 95 microns, and each gap 120 is bounded at one end by surface 127 of an end-wall 125 (FIG. 1) such that the surface 127 of the end-walls 125 are sequentially offset from each other by a known value $\Delta h$. In the preferred embodiment, $\Delta h$ is in the range of about 1 to $10\mu$ and the width of each bar 130 is in the range of about 5 to $15\mu$. In the preferred embodiment, marker 100 comprises 8 gaps and 9 bars, and has a length in the range of about 100 to 250 microns, has a height in the range of about 30 to 100 microns, and has a thickness in the range of about 1 to 10 microns.

Now referring to FIGS. 1 and 3, initially as grinding begins, lapping surface 110 of the optical marker 100 cannot be observed at the ground surface 210. As grinding proceeds, the lapping surface 110 appears on the ground surface 210 and begins to grind away. As grinding continues, at a predetermined point which depends on the height of the tallest gap 120, optical marker 100 splits into two pieces, namely, a partially ground marker 111 and a solid bar 140 as shown in FIG. 3B and 3B'. The solid bar 140 has a bar end 142 comprising of an end-face 145. As grinding proceeds, at a predetermined point which depends on the height of the tallest gap 120 present in the marker 111, the partially ground marker 111 further splits into two additional pieces, namely a partially ground marker (not shown) and a solid bar having end-face 145 appearing on the ground surface 210. This process continues until a predetermined number of end-faces 145 appear on the ground surface 210. In the preferred embodiment, when five end-faces 145 appear on the ground surface 210 (FIG. 2C), that indicates that the grinding is within $5\mu$ of the target throat height or element height. As a result, coarse grinding is stopped and the head is ready for the final lapping step.

In the preferred embodiment, two optical markers 100 are placed, one on each opposite side of the head 300 and adjacent to the ground surface 210, for (a) effective visual monitoring of the degree of skew in head grinding process, (b) redundancy and (c) to increase the accuracy of visual monitoring.

For example, if during the grinding process, visual inspection of the markers 100 reveals that equal numbers of end-faces 145 appear on both sides of the head 300, that implies very little or no skew in the head grinding process. On the other hand, if unequal numbers of end-faces 145 appear on both sides of the head 300, that implies noticeable to substantial skew in the head grinding process depending on how unequal the numbers of end-faces 145 appear on both sides of the head 300 as seen on the ground surface 210.

Figure 4:
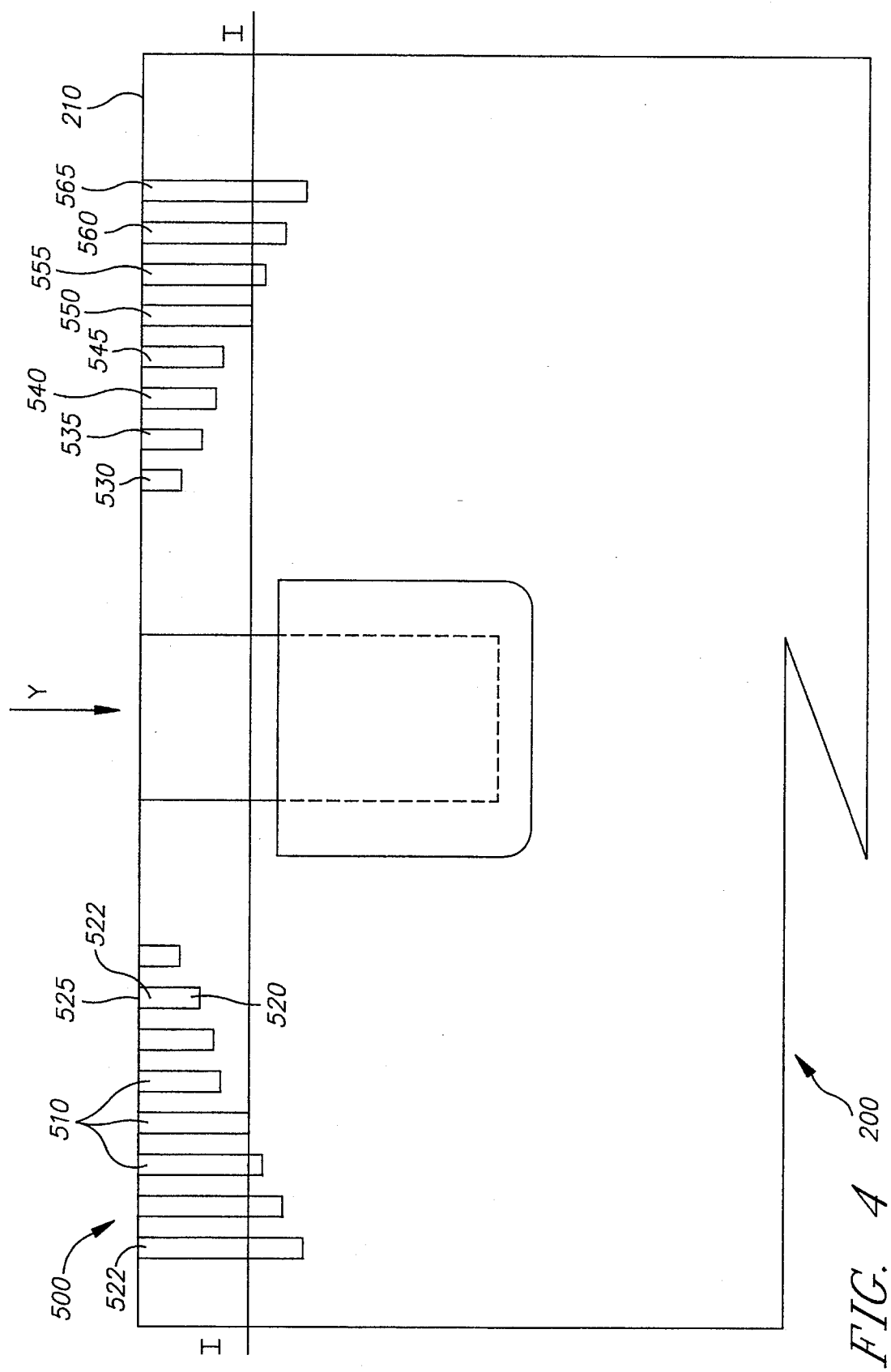
FIG. 4 is a wafer plane view of a chiplet showing the process step for forming the final magnetic layer and the first alternative marker embodiment, together with the magnetic head.
Figure 5:
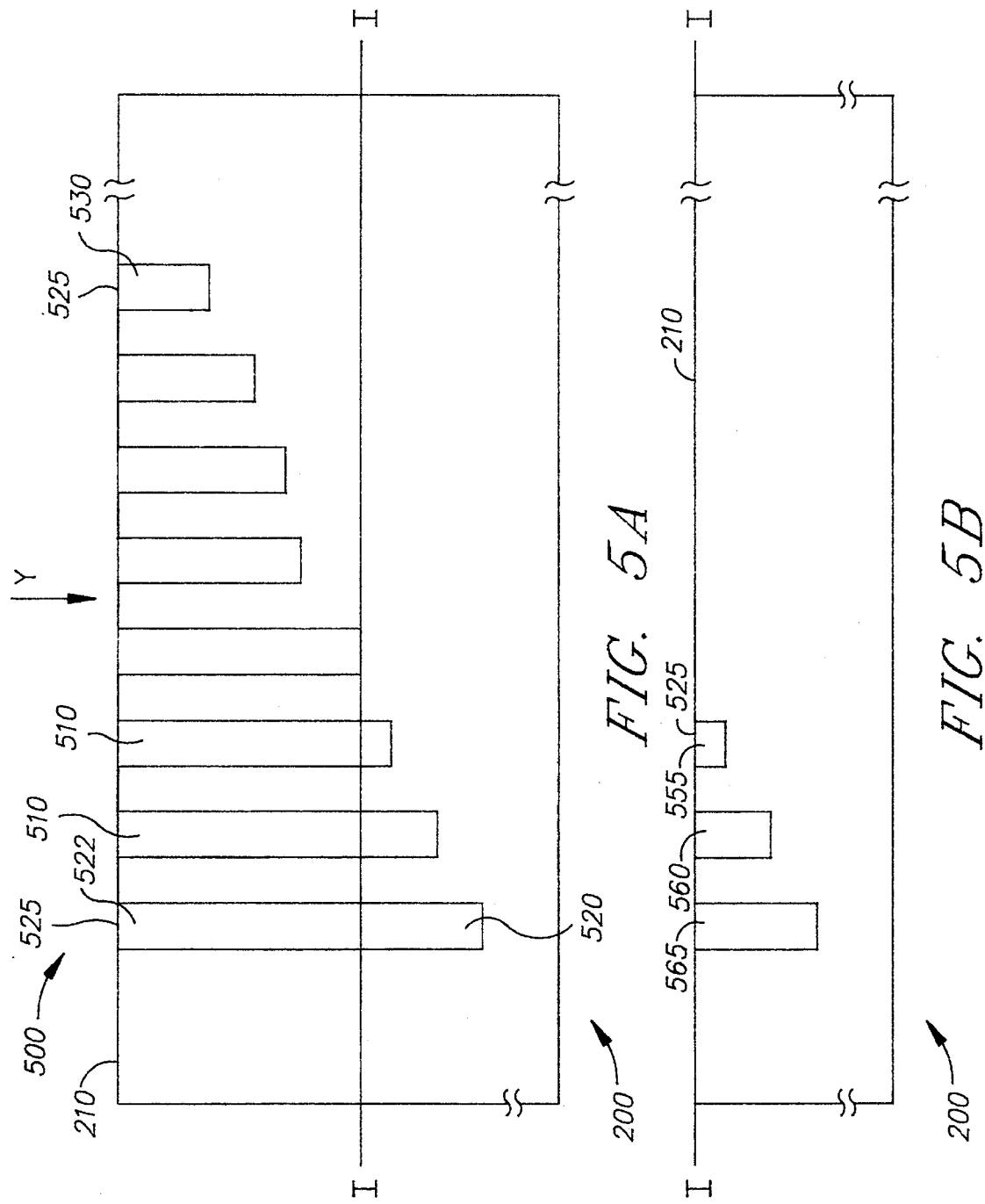
FIG. 5A is an enlarged wafer plane view of the alternative marker of FIG. 4 prior to the beginning of the grinding process.
FIG. 5B is an enlarged wafer plane view of the alternative marker of FIG. 5A at the completion of grinding process.

Now with reference to FIGS. 4, 5A and 5B, there is shown the first alternative optical marker 500 of the present invention shown on a portion of the chiplet 200. Insulator 440 is not shown in FIGS. 5A and 5B. In this embodiment, optical marker 500 comprises a plurality of unequal sized bars 510 having a first end 520 and second end 522. The bars 510 are equally spaced apart from each other. Each bar 510 has a length in the range of about 10 to 100 microns, width in the range of about 5 to 15 microns and height in the range of about 1 to 10 microns. The end 520 of the bars 510 are sequentially offset from each other by a predetermined amount in the range of 1 to 10 microns. The height of the bars 510 also sequentially decreases by a known amount. In the preferred embodiment where optical marker 500 comprises eight bars 510, the bars are labelled, from the shortest to the tallest, as bars 530, 535, 540, 545, 550, 555, 560, and 565. Each end 522 also has an end-face 525 which coincides with the ground surface 210 of the chiplet 200. When the grinding process begins, all the end-faces 525 are seen at the ground surface 210. As grinding proceeds, the bars 510 sequentially disappear from the ground surface 210 starting with the shortest bar 530 (FIG. 4). When a predetermined number of bars disappear, the grinding target has been reached and the head is available for final lapping. In this embodiment, once the five shortest bars (bars 530, 535, 540, 545, 550) disappear, the grinding target is reached (FIG. 5B).

Figure 6:
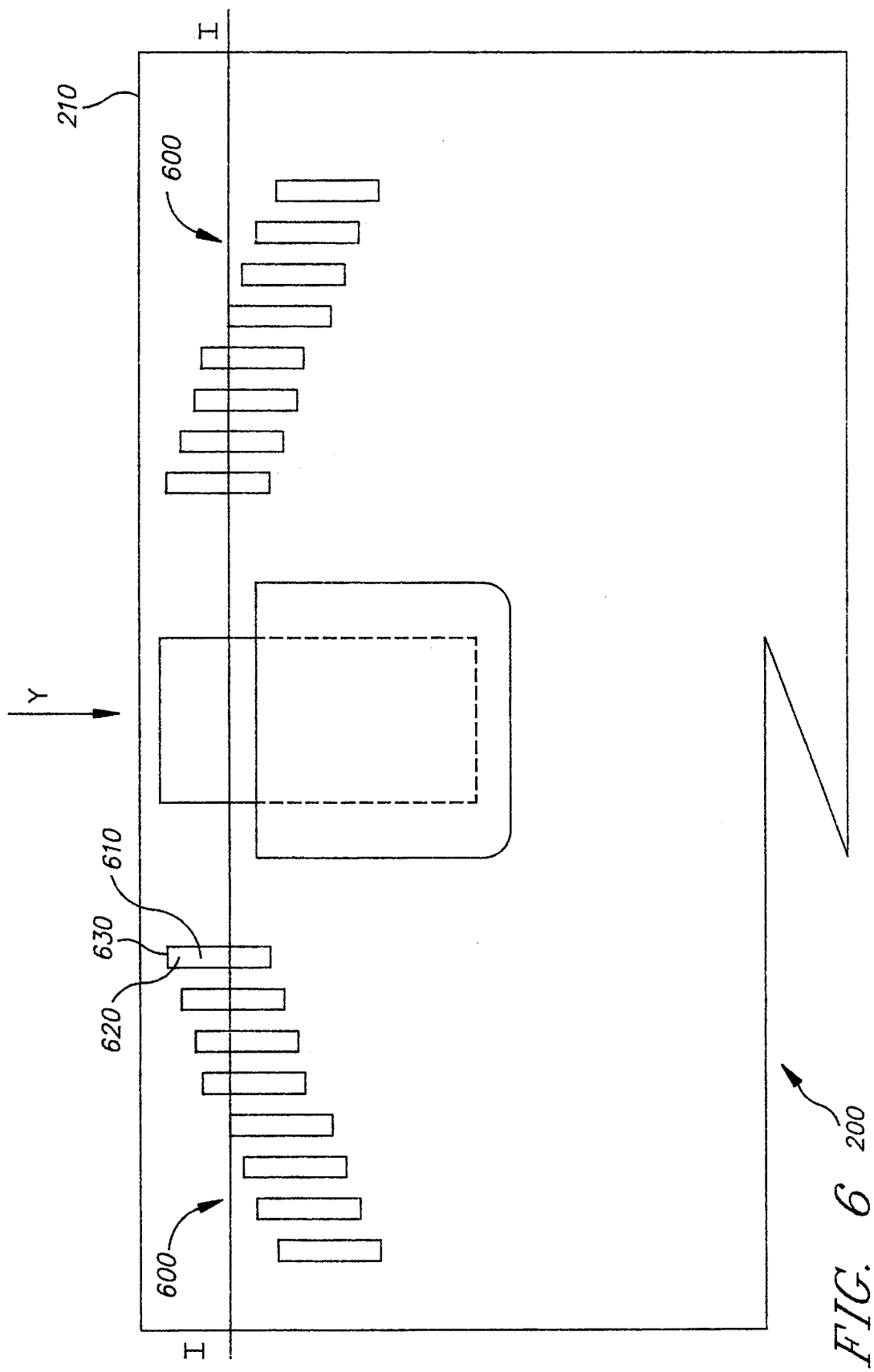
FIG. 6 is a wafer plane view of a chiplet showing the process step for forming the final magnetic layer and the second alternative marker embodiment, together with the magnetic head.
Figure 7:
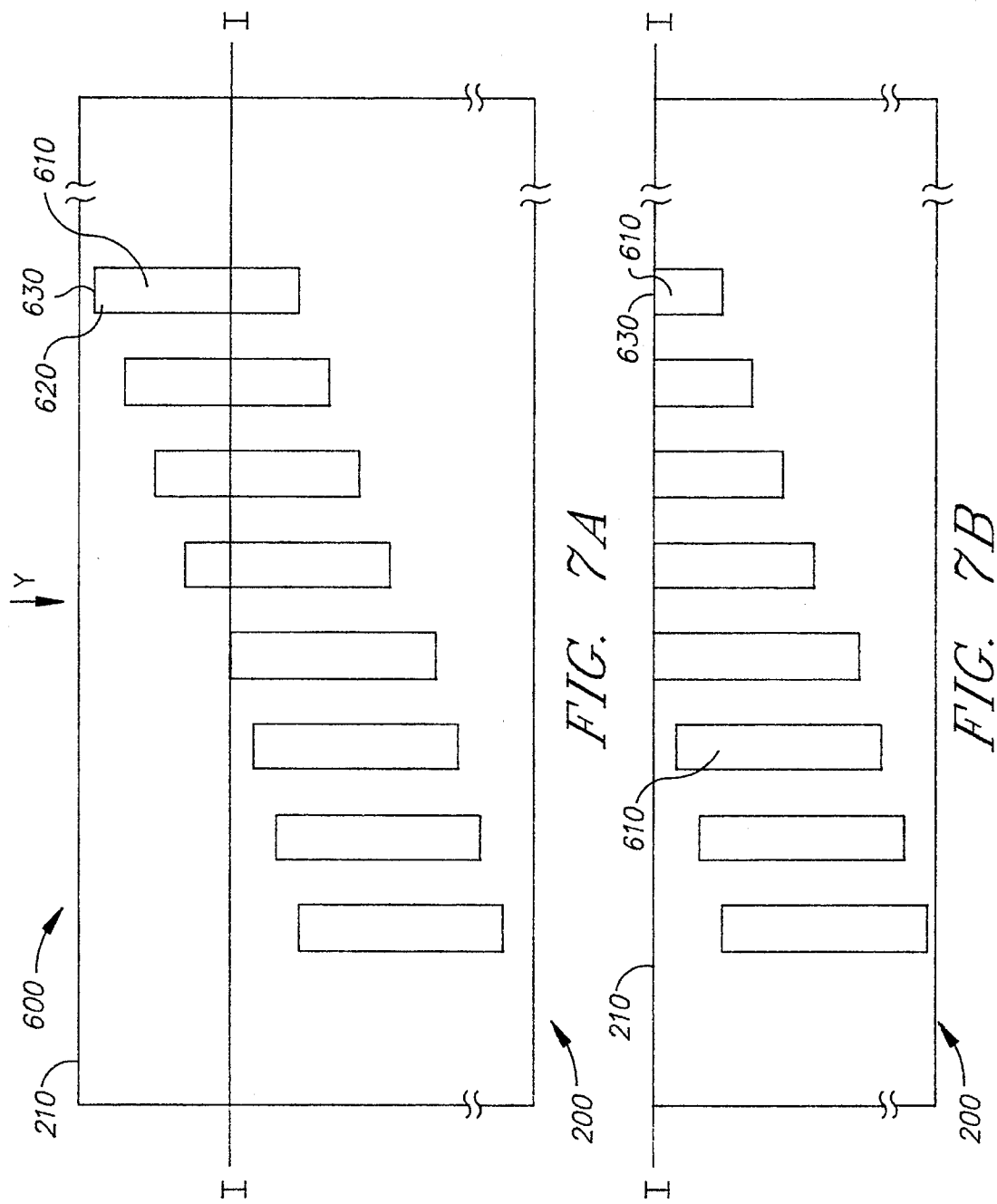
FIG. 7A is an enlarged wafer plane view of the optical marker of FIG. 6 prior to the beginning of the grinding process.
FIG. 7B is an enlarged wafer plane view of the optical marker of FIG. 7A at the completion of the grinding process.
Figure 8:
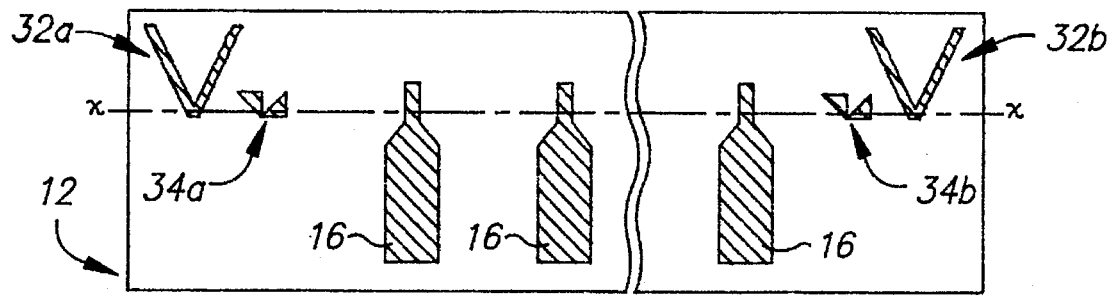
FIG. 8 shows a prior art lapping marker.
Figure 9:
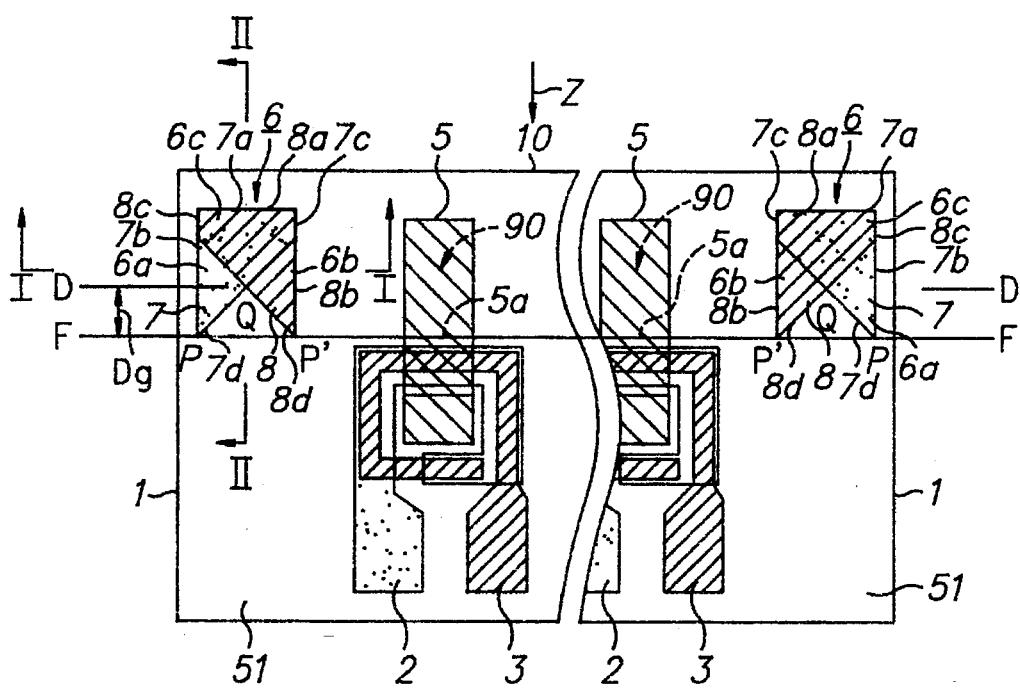
FIG. 9 shows another prior art lapping marker.

Now with reference to FIG. 6, 7A, and 7B, there is shown the second alternative marker 600 of the present invention comprising a plurality of equal sized bars 610 having a bar end 620 and a predetermined height, length and width, similar to those stated above for the first alternative marker 500. Insulator 440 is not shown in FIGS. 7A and 7B. The bars 610 are substantially parallel with each other, spaced equally apart from each other, and offset sequentially from each other. The bar end 620 having an end face 630 is adjacent to the ground surface 210 of the chiplet 200 in the range of about 1 to 50 microns. The end-faces 630 are also sequentially offset from each other in the range of about 1 to 10 microns.

Initially, none of the end faces 630 are seen at the ground surface 210 (FIG. 7A). As grinding proceeds in the Y direction, the end-faces 630 begin to sequentially appear on the ground surface 210. Once a known number of end-faces 630 appear on the ground surface 210, it indicates that the grinding target has been reached and head is available for final lapping (FIG. 7B). If more than a predetermined number of end-faces 630 appear on the ground surface 210, that indicates that the grinding target has been missed. A typical marker 600 as shown in FIG. 6 has about 8 bars 610 spaced from each other by about 5 to 15μ. The bars 610 are also sequentially offset from each other at the end 620 next to the ground surface 210 by about 1 to 10μ. In this embodiment, once five end-faces 630 appear on the ground surface, the grinding target is reached (FIG. 7B). Also, two optical markers 600 may be utilized, as shown in FIG. 6, in order to measure the degree of skew present in head grinding process.

While three different embodiments of the present invention have been shown in detail, various changes can be made to these embodiments without departing from the spirit and scope of the present invention. For example, the visual marker 100 can be made of various shapes, sizes, and materials. Substantially more or less number of bars can be utilized or bars can be made of various sizes, spaced differently and have various offsets.

Furthermore, although in the preferred embodiment the optical marker is formed during the formation of the final magnetic layer, the optical marker may be formed in any process step during the fabrication of a thin film head. For example, the optical marker may be formed on any of the insulating layers 320, 340, 370, 390, 400 or 415 using the same insulating material; or it may be formed on any of the magnetic layers 330, 350, 380, 420 or 430 using the same magnetic material; or it may be formed on substrate 310, MR sensor lead 360 or conductor 410. Consequently, markers may be made of insulating materials such as $Al_2O_3$, $SiO_2$, ceramic or similar insulating materials; conducting materials such as copper; or magnetic materials such as permalloy or sendust or similar materials.

Furthermore, if an MR element height is the critical dimension as far as lapping process is concerned, it can easily be understood by those skilled in the requisite art that fabricating optical markers during the same process step as for fabricating an MR element, using the same material, provides the highest correlation between the marker and the MR element during the grinding process.

Furthermore, although this invention has been applied to an individual chiplet, it may very well be utilized at the wafer level or any other optical end-point monitoring system such as row lapping system. To utilize row lapping system, the wafer is divided into rows where each row comprises many chiplets and then all the chiplets on the same row are lapped simultaneously (row lapping). Accordingly, it is to be understood that the invention is not to be limited by the specific illustrated embodiments but only by the scope of the appended claims.

We claim:

1. In a chiplet comprising a thin-film magnetic head and an optical marker, said chiplet having a ground surface, said optical marker for detecting the amount of grinding performed on said magnetic head, said optical marker comprising:

a block having a lapping surface, the lapping surface being adjacent to said chiplet ground surface; and a plurality of gaps formed within said block such that as the lapping surface of said block is ground away, the block breaks into individual solid bars, each solid bar having an end-face where visual counting of the number of end-faces indicate the amount of the grinding left to be performed to reach a desired grinding target.

2. An optical marker as recited in claim 1 wherein said bars are separated from each other by a known distance to provide visual resolution.

3. An optical marker as recited in claim 2 wherein said separation distance is in the range of about 5 to 25 microns.

4. An optical marker as recited in claim 1 wherein the lapping surface of said block is substantially parallel to the ground surface.

5. An optical marker as recited in claim 1 wherein said optical marker is made of electrically conducting material.

6. An optical marker as recited in claim 5 wherein said electrically conducting material is copper.

7. An optical marker as recited in claim 1 wherein said optical marker is made of insulating material.

8. An optical marker as recited in claim 7 wherein said insulating material is silicon dioxide.

9. An optical marker as recited in claim 7 wherein said insulating material is aluminum dioxide.

10. An optical marker as recited in claim 1 wherein said optical marker is made of magnetic material.

11. An optical marker as recited in claim 10 wherein said magnetic material is permalloy.

12. An optical marker as recited in claim 10 wherein said magnetic material is sendust.

13. In a chiplet comprising a thin-film magnetic head and a pair of optical markers, said chiplet comprising a ground surface, said optical markers for detecting the amount of skew present in a magnetic head grinding process, one optical marker formed on each opposite side of the head adjacent to the ground surface, each optical marker comprising:

a block, said block having a lapping surface adjacent to the ground surface of said chiplet; and a plurality of gaps formed within said block such that as the lapping surface of the block is ground away, the block breaks into individual solid bars, each solid bar having an end-face where visual counting of the number of end-faces appearing on opposite sides of the head visually indicate the degree of skew present in the grinding process.

14. An optical marker as recited in claim 13 wherein said optical marker is made of electrically conducting material.

15. An optical marker as recited in claim 14 wherein said electrically conducting material is copper.

16. An optical marker as recited in claim 13 wherein said optical marker is made of insulating material.

17. An optical marker as recited in claim 16 wherein said insulating material is silicon dioxide.

18. An optical marker as recited in claim 16 wherein said insulating material is aluminum dioxide.

19. An optical marker as recited in claim 13 wherein said optical marker is made of magnetic material.

20. An optical marker as recited in claim 19 wherein said magnetic material is permalloy.

21. An optical marker as recited in claim 19 wherein said magnetic material is sendust.

22. In a chiplet comprising a thin-film magnetic head and an optical marker, said chiplet having a ground surface, said optical marker for detecting the amount of grinding left to be performed on said magnetic head, said optical marker comprising:

a block having a lapping surface adjacent to the ground surface of said chiplet; and a plurality of gaps formed within said block where each gap is bounded at one end by a surface of an end-wall such that as the lapping surface of the block is ground away, the block breaks into individual solid bars, each solid bar having an end-face such that visual counting of the number of end-faces appearing on the lapping surface indicate the amount of grinding left to be performed to reach a desired grinding target.

23. An optical marker as recited in claim 22 wherein the surface of said end-walls are sequentially offset from each other by a predetermined amount.

24. An optical marker as recited in claim 23 wherein said offset is in the range of about 1 to 10 microns.

25. An optical marker as recited in claim 22 wherein said bars are separated from each other by a known distance sufficiently large enough to provide visual resolution.

26. An optical marker as recited in claim 22 wherein said optical marker is made of electrically conducting material.

27. An optical grinding marker as recited in claim 22 wherein said optical marker is made of insulating material.

28. An optical grinding marker as recited in claim 22 wherein said optical marker is made of magnetic material.

* * * * *